(12) United States Patent
Kani et al.

(10) Patent No.: US 11,513,300 B2
(45) Date of Patent: Nov. 29, 2022

(54) OPTICAL RECEPTACLE AND OPTICAL MODULE

(71) Applicant: Enplas Corporation, Saitama (JP)

(72) Inventors: Hiroyoshi Kani, Saitama (JP); Honoka Sato, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 17/137,520

(22) Filed: Dec. 30, 2020

(65) Prior Publication Data

US 2022/0206231 A1 Jun. 30, 2022

(51) Int. Cl.
*G02B 6/42* (2006.01)

(52) U.S. Cl.
CPC ......... *G02B 6/4206* (2013.01); *G02B 6/4204* (2013.01); *G02B 6/4263* (2013.01)

(58) Field of Classification Search
None
See application file for complete search history.

(56) References Cited

U.S. PATENT DOCUMENTS

| | | | | |
|---|---|---|---|---|
| 4,770,488 A | * | 9/1988 | Shank | G02B 6/322 385/79 |
| 4,822,129 A | * | 4/1989 | Webb | G02B 6/322 385/80 |
| 2010/0302543 A1 | * | 12/2010 | Kurihara | G02B 6/4225 356/400 |
| 2014/0086536 A1 | | 3/2014 | Shibuya | |

FOREIGN PATENT DOCUMENTS

| | | | | |
|---|---|---|---|---|
| JP | 2012252308 A | | 12/2012 | |
| JP | 2014137527 A | * | 7/2014 | G02B 6/4204 |

\* cited by examiner

*Primary Examiner* — Michelle R Connelly
(74) *Attorney, Agent, or Firm* — Brundidge & Stanger, P.C.

(57) ABSTRACT

An optical receptacle is disposed between a light-emitting element and an optical transmission member and configured to optically couple the light-emitting element and the optical transmission member, the optical receptacle including an incidence surface configured to allow incidence of light emitted from the light-emitting element; and an emission surface configured to emit, toward the optical transmission member, light entered from the incidence surface and travelled inside the optical receptacle, the emission surface being an inner surface of a recess. The emission surface includes a first emission surface having a substantially spherical cap shape, and a second emission surface contiguous with the first emission surface, the second emission surface having a shape of a side surface of a substantially frustum shape.

4 Claims, 5 Drawing Sheets

OPTICAL RECEPTACLE AND OPTICAL MODULE

TECHNICAL FIELD

The present invention relates to an optical receptacle and an optical module.

BACKGROUND ART

In the related art, in optical communications using an optical transmission member such as an optical fiber and an optical waveguide, an optical module including a light-emitting element such as a surface-emitting laser (for example, vertical cavity surface emitting laser (VCSEL)) is used. The optical module includes one or more photoelectric conversion elements (light-emitting elements or light-receiving elements), and a transmitting optical receptacle, a receiving optical receptacle, or a transmitting and receiving optical receptacle (see, for example, PTL 1).

PTL 1 discloses a receiving module. The optical receptacle disclosed in PTL 1 includes an optical fiber attaching portion, a photoelectric conversion device attaching portion, and a lens. A light-receiving element is disposed opposite to the photoelectric conversion device attaching portion, and an optical fiber is disposed opposite to the optical fiber attaching portion.

In a typical optical module, a part of light having reached a light-receiving element after being emitted from an optical fiber may be reflected at the light reception surface of the light-receiving element so as to reenter the optical fiber. Then, a part of the light reentered into the optical fiber may reach the light-emitting element. When light enters the light-emitting element in this manner, the quantity of the light emitted from the light-emitting element becomes unstable.

In the optical module disclosed in PTL 1, the light entered into the optical receptacle after being emitted from the optical fiber is emitted from the lens toward the light-receiving element. The light-receiving element is disposed such that its light reception surface is tiled with respect to a plane perpendicular to the optical axis of the lens. In this manner, the light emitted from the lens toward the light-receiving element does not reenter the lens even when the light is reflected at the light reception surface of the light-receiving element, Thus, the light emitted from the optical fiber does not reach the light-emitting element, and optical communications can be stably performed.

CITATION LIST

Patent Literature

PTL 1
Japanese Patent Application Laid-Open No. 2012-252308

SUMMARY OF INVENTION

Technical Problem

It is conceivable to apply the receiving optical receptacle disclosed in PTL 1 to a transmitting optical receptacle. In this case, the transmitting optical receptacle emits, toward an end surface of optical fiber, light emitted from the light-emitting element. When the receiving optical receptacle disclosed in PTL 1 is applied to a transmitting optical receptacle, however, it is difficult to perform optical measurement and position adjustment for ensuring the light coupling efficiency between the light-emitting element and the end surface of the optical fiber since the optical axis of the light-emitting element is tilted with respect to the optical receptacle.

In view of this, an object of the present invention is to provide an optical receptacle that can reduce return light without tilting the light-emitting element. In addition, another object of the present invention is to provide an optical module including the optical receptacle.

Solution to Problem

To achieve the above-mentioned object, an optical receptacle of an embodiment of the present invention is disposed between a light-emitting element and an optical transmission member and configured to optically couple the light-emitting element and the optical transmission member, the optical receptacle including: an incidence surface configured to allow incidence of light emitted from the light-emitting element; and an emission surface configured to emit, toward the optical transmission member, light entered from the incidence surface and travelled inside the optical receptacle, the emission surface being an inner surface of a recess. The emission surface includes: a first emission surface having a substantially spherical cap shape, and a second emission surface contiguous with the first emission surface, the second emission surface having a shape of a side surface of a substantially frustum shape.

In addition, an optical module of an embodiment of the present invention includes a photoelectric conversion device including a light-emitting element; and the optical receptacle that is configured to optically couple light emitted from the light-emitting element with an optical transmission member.

Advantageous Effects of Invention

According to the present invention, an optical receptacle and an optical module that can reduce return light without tilting the light-emitting element can be provided.

DESCRIPTION OF EMBODIMENTS

An optical receptacle and an optical module according to an embodiment of the present invention are elaborated below with reference to the accompanying drawings.

Configuration of Optical Module

Figure 1:
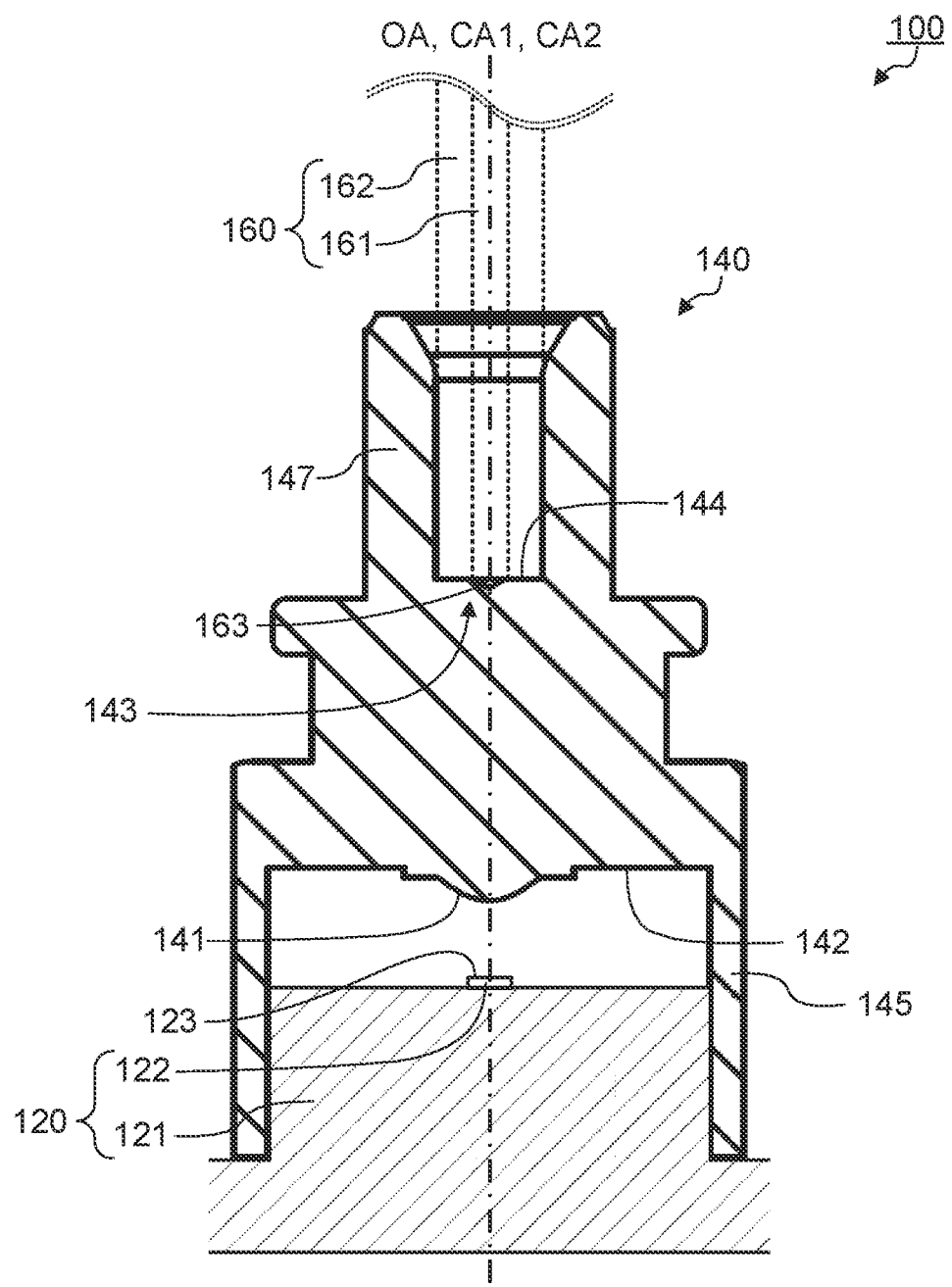
FIG. 1 is a drawing illustrating a configuration of an optical module of an embodiment of the present invention.

FIG. 1 is a sectional view of optical module 100 according to Embodiment 1 of the present invention.

As illustrated in FIG. 1, optical module 100 includes substrate-mounted photoelectric conversion device 120 including light-emitting element 122, and optical receptacle 140. Optical module 100 is a transmitting optical module, and is used with optical transmission member 160 coupled (hereinafter also referred to as "connected") with optical receptacle 140.

Photoelectric conversion device 120 includes substrate 121 and light-emitting element 122.

Substrate 121 supports light-emitting element 122 and is fixed with respect to optical receptacle 140. Substrate 121 is, for example, a glass composite substrate, a glass epoxy substrate, a flexible substrate or the like. Light-emitting element 122 is disposed on substrate 121.

Light-emitting element 122 is, for example, a vertical-cavity surface-emitting laser (VCSEL).

Optical receptacle 140 is disposed on substrate 121 of photoelectric conversion device 120. Optical receptacle 140 optically couples light-emitting surface 123 of light-emitting element 122 and end surface 163 of optical transmission member 160 in the state where optical receptacle 140 is disposed between photoelectric conversion device 120 and optical transmission member 160. While optical receptacle 140 optically couples light-emitting surface 123 of one light-emitting element 122 and end surface 163 of one optical transmission member 160 in the present embodiment, optical receptacle 140 may optically couple light-emitting surfaces 123 of a plurality of light-emitting elements 122 and end surfaces 163 of a plurality of optical transmission members 160. The configuration of optical receptacle 140 will be elaborated later.

The type of optical transmission member 160 is not limited. Examples of the type of optical transmission member 160 include optical fibers and light waveguides. In the present embodiment, optical transmission member 160 is an optical fiber, and includes core 161 and clad 162. The number of optical transmission member 160 is not limited, and is selected in accordance with the configuration of optical receptacle 140. One optical transmission member 160, or a plurality of optical transmission members 160 may be provided. In the present embodiment, one optical transmission member 160 is provided.

Configuration of Optical Receptacle

Figure 2:
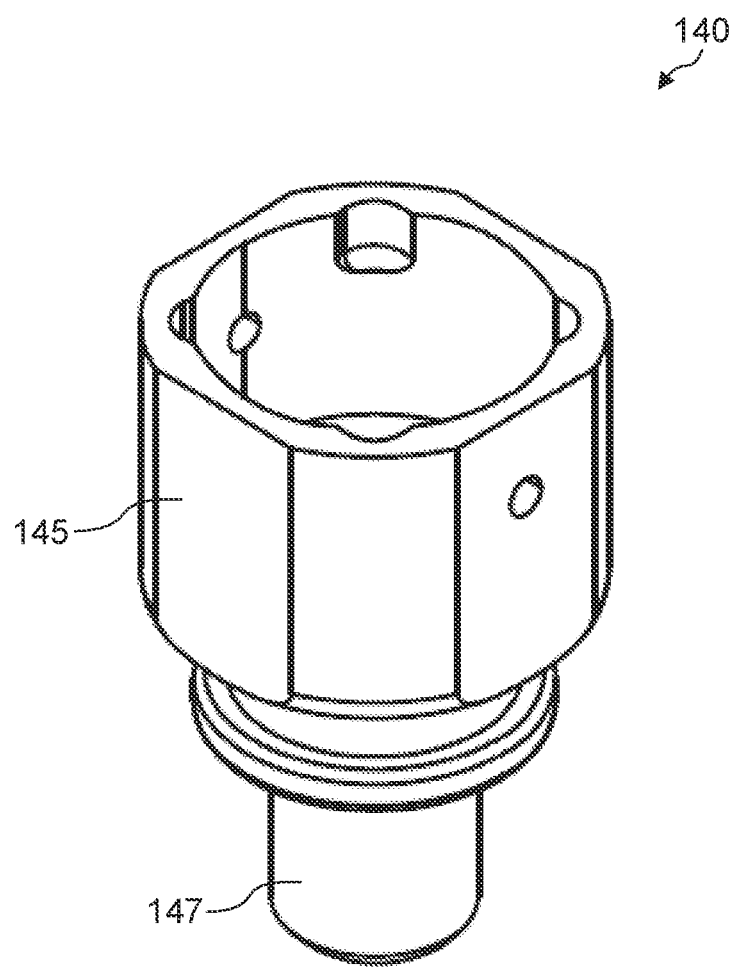
FIG. 2 is a perspective view of an optical receptacle of the embodiment of the present invention as viewed from the bottom side.
Figure 3A:
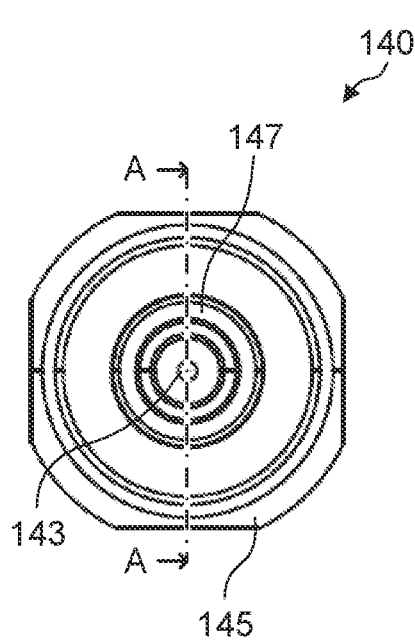
FIGS. 3A to 3D are other drawings illustrating a configuration of the optical receptacle.
Figure 3C:
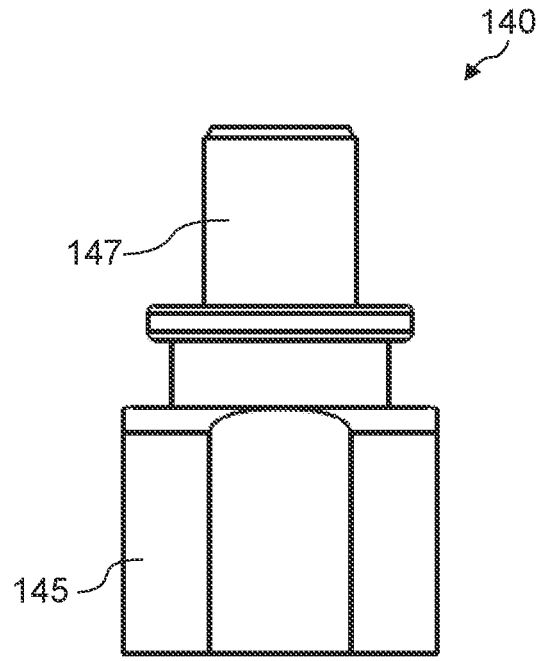
Figure 3B:
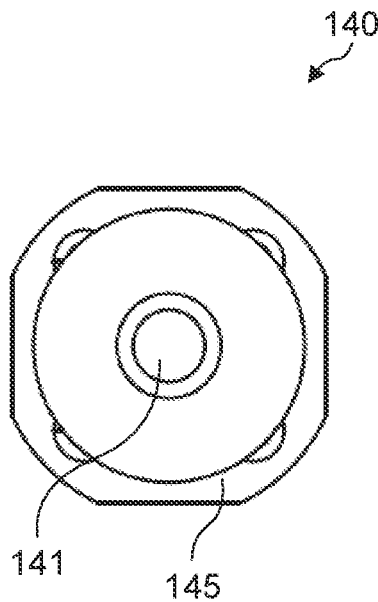
Figure 3D:
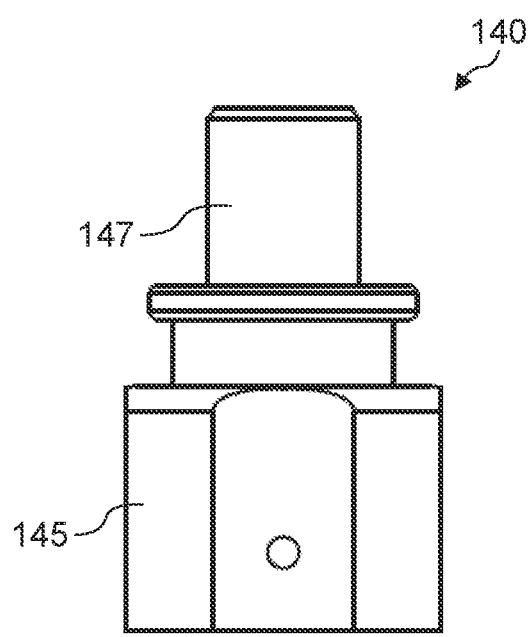
Figure 4A:
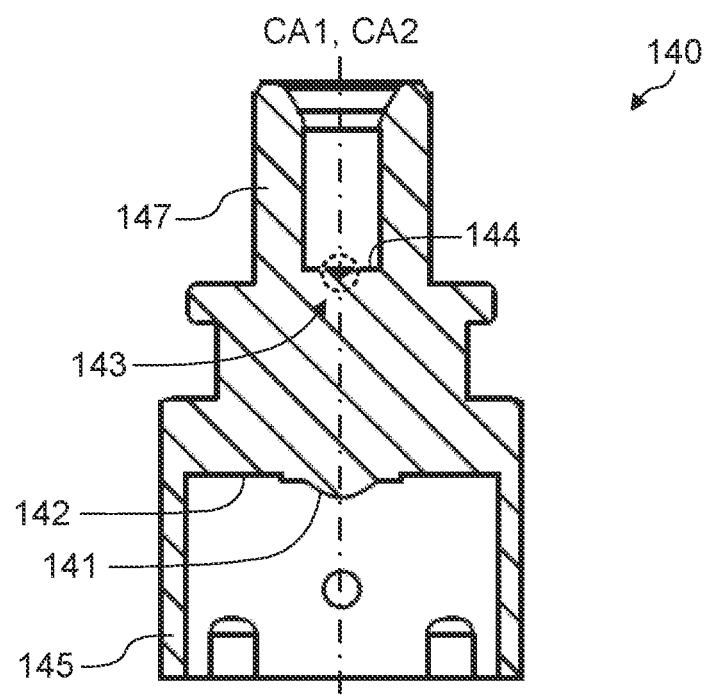
FIGS. 4A and 4B are sectional views illustrating a configuration of the optical receptacle.
Figure 4B:
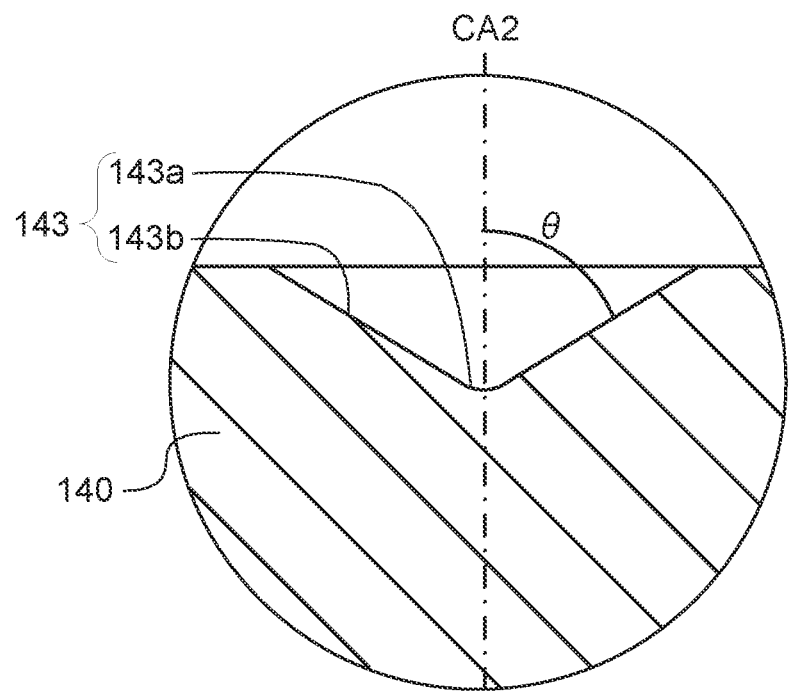

FIGS. 2 to 4B illustrate a configuration of optical receptacle 140. FIG. 2 is a perspective view of optical receptacle 140 as viewed from the bottom side. FIG. 3A is a plan view of optical receptacle 140, FIG. 3B is a bottom view, FIG. 3C is a front view, and FIG. 3D is a left side view. FIG. 4A is a sectional view taken along line A-A of FIG. 3A, and FIG. 4B is an enlarged view of the region indicated with the broken line in of FIG. 4A.

Optical receptacle 140 is optically transparent, and emits, toward end surface 163 of optical transmission member 160, at least a part of light emitted from light-emitting surface 123 of light-emitting element 122. As illustrated in FIGS. 2 to 4B, optical receptacle 140 includes incidence surface 141 and emission surface 143. In the present embodiment, optical receptacle 140 further includes substrate fixing part 145 for fixing substrate 121 and positioning part 147 for positioning optical transmission member 160.

Optical receptacle 140 is formed of a material that is optically transparent to the light of the wavelength used for optical communications. Examples of such a material include transparent resins such as polyetherimide (PEI) and cyclic olefin resin. In addition, optical receptacle 140 is manufactured by injection molding, for example.

Substrate fixing part 145 fixes substrate 121 of photoelectric conversion device 120 with respect to optical receptacle 140. The configuration of substrate fixing part 145 is not limited as long as the above-mentioned functions can be ensured. In the present embodiment, substrate fixing part 145 has a bottomed cylindrical shape, First surface 142 where incidence surface 141 is disposed is disposed in the bottom portion of substrate fixing part 145.

Incidence surface 141 is an optical surface for entering, into optical receptacle 140, light emitted from light-emitting surface 123 of light-emitting element 122. Incidence surface 141 is formed in first surface 142. The shape of incidence surface 141 is not limited as long as light emitted from light-emitting element 122 can be converted to a predetermined light flux and can be entered into optical receptacle 140. Incidence surface 141 may be a convex lens surface protruding toward light-emitting element 122, or a concave lens surface recessed with respect to light-emitting element 122, or, a flat surface. In the present embodiment, incidence surface 141 is a convex lens surface protruding toward light-emitting element 122. The shape of incidence surface 141 in plan view is not limited. The shape of incidence surface 141 in plan view is a circular shape, or a polygonal shape. In the present embodiment, the shape of incidence surface 141 in plan view is a circular shape.

The size of incidence surface 141 is not limited, but preferably the size of incidence surface 141 is larger than light-emitting surface 123 of light-emitting element 122. Preferably, first central axis CA1 of incidence surface 141 is perpendicular to light-emitting surface 123 of light-emitting element 122. First central axis CA1 of incidence surface 141 may or may not be coincide with optical axis OA of light emitted from light-emitting surface 123 of light-emitting element 122. In the present embodiment, first central axis CA1 of incidence surface 141 coincides with optical axis OA of light emitted from light-emitting surface 123 of light-emitting element 122. The number of incidence surfaces 141 is not limited, but normally, the number of incidence surfaces 141 is the same as the number of light-emitting elements 122 and optical transmission member 160. In the present embodiment, one incidence surface 141 is provided.

Incidence surface 141 may control light emitted from light-emitting element 122 such that the light becomes parallel light, converged light, or diffused light. In the present embodiment, incidence surface 141 controls light emitted from light-emitting element 122 such that the light becomes converged light.

Emission surface 143 is an optical surface that emits, toward end surface 163 of optical transmission member 160, light having travelled from incidence surface 141, and controls light reflected by end surface 163 such that the light goes away from optical axis OA of light-emitting element 122. In the present embodiment, emission surface 143 is disposed on the side opposite to incidence surface 141 in such a manner as to face end surface 163 of optical transmission member 160. Emission surface 143 is the inner surface of a recess formed in second surface 144 disposed on the side opposite to first surface 142. The shape of the recess is a substantially cone shape with a rounded tip end. The shape of the bottom surface of the cone is not limited, and may be, for example a circular shape or a polygonal shape. In the case where the shape of the bottom surface is a polygonal shape, it is preferable that the number of the corners are large from a view point of the coupling efficiency of the light emitted from light-emitting element 122. Note that in the present embodiment, the shape of the bottom surface is a circular shape.

The size of emission surface 143 is not limited as long as the light having travelled from optical receptacle 140 can be appropriately emitted. Second central axis CA2 of emission surface 143 may or may not be perpendicular to end surface 163 of optical transmission member 160. In the present embodiment, second central axis CA2 of emission surface 143 is perpendicular to end surface 163 of optical transmission member 160. In addition, in the present embodiment, second central axis CA2 of emission surface 143 coincides with first central axis CA1 of incidence surface 141. Specifically, optical axis OA of the light emitted from light-emitting surface 123 of light-emitting element 122, first central axis CA1 of the incidence surface, and second central axis CA2 of emission surface 143 coincide with each other. The number of emission surfaces 143 is not limited, but normally, the number of emission surfaces 143 is the same as the number of incidence surface 141 and optical transmission member 160. In the present embodiment, one emission surface 143 is provided. Emission surface 143 includes first emission surface 143a located at the tip end of the recess having a substantially cone shape and second emission surface 143b located at the side surfaces (portions other than the tip end) of the recess.

In plan view of emission surface 143, first emission surface 143a is disposed at the center portion, First emission surface 143a has a substantially spherical cap shape. The "spherical cap" means a part of a sphere cut by a plane. In the present embodiment, the height of the spherical cap is smaller than the radius of the sphere. As elaborated later, preferably, the curvature radius of first emission surface 143a in the cross section including the optical axis of light incident on emission surface 143 (the central axis of the substantially frustum shape described later) is equal to or greater than 0.02 mm and smaller than 0.10 mm, more preferably within a range of 0.02 to 0.05 mm from the viewpoint of reducing the return light. Preferably, in the cross section including the optical axis of light incident on emission surface 143, the inclination angle of the tangent line at the edge of first emission surface 143a (the connecting part with second emission surface 143b) is the same as the inclination angle of second emission surface 143b. In this manner, first emission surface 143a and second emission surface 143b can be smoothly connected.

In plan view of emission surface 143, second emission surface 143b is contiguous with first emission surface 143a and surrounds first emission surface 143a. Second emission surface 143b is the shape of the side surface of a substantially frustum shape. Second emission surface 143b is composed of a plurality of flat surfaces in the case where the bottom surface of the frustum has a polygonal shape. Second emission surface 143b is composed of one curved surface in the case where the bottom surface of the frustum is composed of a one circular shape. In the present embodiment, the bottom surface of the frustum has a circular shape, and therefore second emission surface 143b is composed of one curved surface, Preferably, the angle of second emission surface 143b with respect to the optical axis of light incident on emission surface 143 (the central axis of the substantially frustum shape) is 15° to 75°. If the angle is smaller than 15°, the metal mold for molding optical receptacle 140 may be difficult to fabricate. If the angle is greater than 75°, the return light may not be sufficiently suppressed.

Positioning part 147 positions end surface 163 of optical transmission member 160 with respect to optical receptacle 140. The configuration of positioning part 147 is not limited as long as the above-mentioned functions can be ensured. In the present embodiment, positioning part 147 has a bottomed cylindrical shape. By inserting optical transmission member 160 from the opening of positioning part 147, the end portion of optical transmission member 160 is disposed at second surface 144 where emission surface 143 is formed. That is, clad 162 of optical transmission member 160 makes contact with second surface 144, and core 161 of optical transmission member 160 faces emission surface 143.

Light Path

Figure 5A:
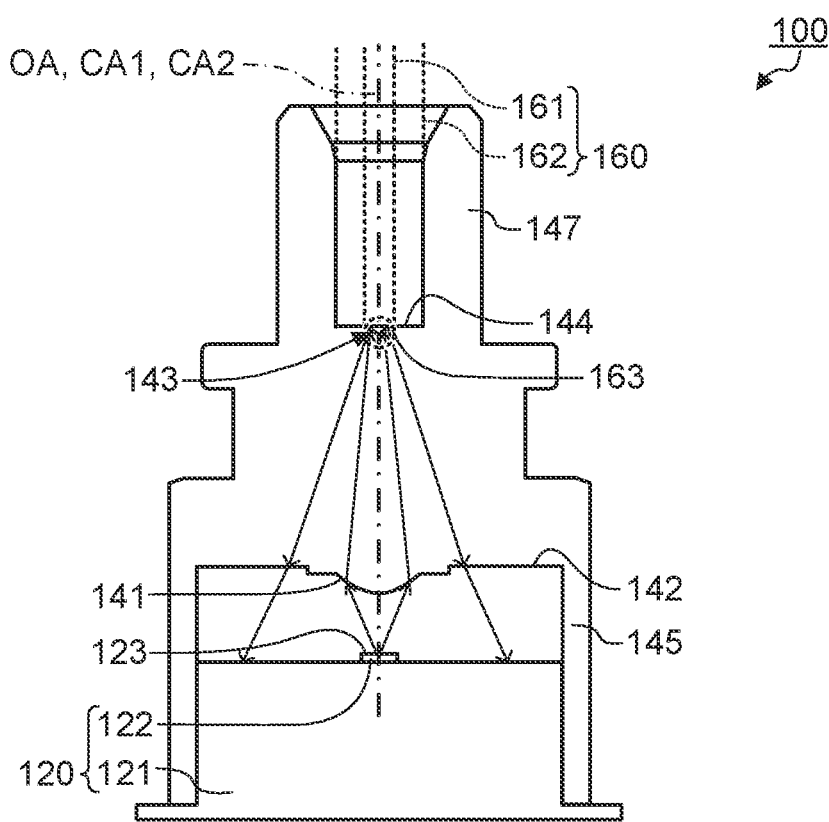
FIGS. 5A and 5B illustrate light paths of the optical module.
Figure 5B:
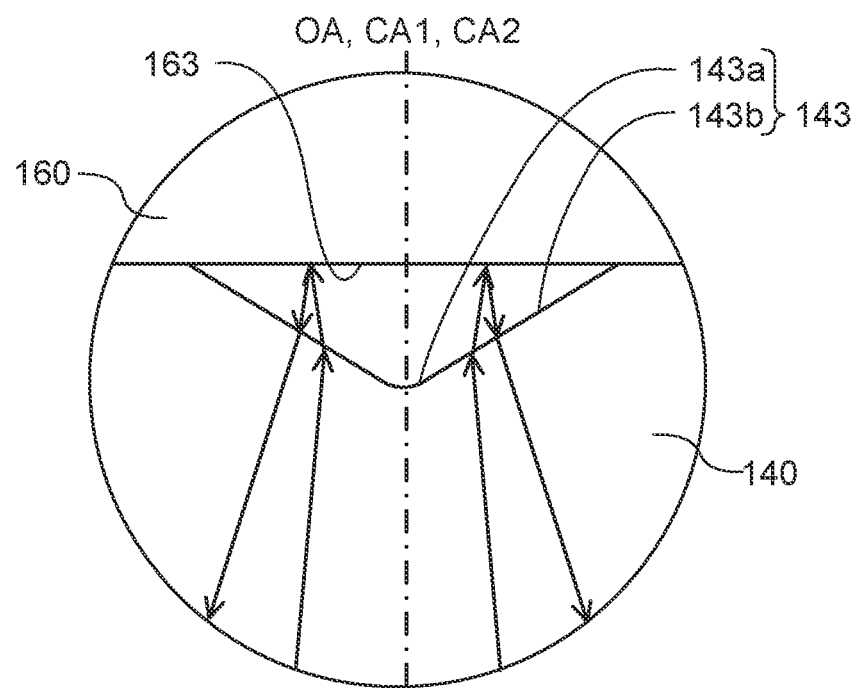

FIGS. 5A and 5B illustrate light paths of optical module 100. FIG. 5A illustrates light paths of optical module 100, and FIG. 5B is an enlarged view illustrating light paths in the vicinity of emission surface 143. Note that in FIGS. 5A and 5B, hatching is omitted to illustrate light paths.

As illustrated in FIGS. 5A and 5B, light emitted from light-emitting surface 123 of light-emitting element 122 enters optical receptacle 140 from incidence surface 141, Incidence surface 141 controls the light emitted from light-emitting element 122 in such a manner as to converge the light. The light entered from incidence surface 141 converges as it travels inside optical receptacle 140.

Light having traveled through optical receptacle 140 reaches emission surface 143. The light having reached emission surface 143 travels toward end surface 163 of optical transmission member 160. Most of the light having reached end surface 163 of optical transmission member 160 enters core 161 of optical transmission member 160, and a part of the light is reflected at end surface 163. The light reflected at end surface 163 reenters optical receptacle 140 from emission surface 143. At this time, the light reflected at end surface 163 is refracted at emission surface 143 so as to travel away from second central axis CA2 of emission surface 143. Thus, the light reentered into optical receptacle 140 does not reach incidence surface 141, but is emitted to the outside from first surface 142. The light emitted to the outside does not impinge on light-emitting surface 123 of light-emitting element 122. In this manner, the return light can be suppressed even in the case where optical axis OA of light-emitting element 122, first central axis CA1 of incidence surface 141 and second central axis CA2 of emission surface 143 coincide with each other Simulation Next, relationships between the light coupling efficiency and the return light were simulated while changing the curvature radius of first emission surface 143a and the inclination angle of second emission surface 143b.

A 10 G VCSEL was used as light-emitting element 122. An optical fiber with a diameter of 50 μm and an NA of 0.2 was used as optical transmission member 160. The distance between the vertex of first emission surface 143a and end surface 163 of optical transmission member 160 was set to 0.1 mm.

Note that in this simulation, the light coupling efficiency is represented by the percentage of the quantity of the light incident on optical transmission member 160 with respect to the quantity of the light emitted from light-emitting element 122. In addition, the ratio of the return light is represented by the percentage of the quantity of the light reflected at optical transmission member 160 and reached light-emitting surface 123 of light-emitting element 122 with respect to the quantity of the light emitted from light-emitting element 122.

The influence of the curvature radius of first emission surface 143a and the inclination angle of second emission surface 143 on the return light is shown in Table 1. In addition, the influence of the curvature radius of first emission surface 143a and the inclination angle of second emission surface 143b on the light coupling efficiency is shown in Table 2.

TABLE 1

| Return Light (%) | | Curvature Radius (mm) of First Emission Surface | | | | | |
|---|---|---|---|---|---|---|---|
| | | <0.02 | 0.02 | 0.03 | 0.05 | 0.1 | >0.10 |
| Inclination Angle (°) of Second Emission Surface | >75 | Less Effective against Return Light | | | | | |
| | 75 | Not Preferable Because Light Coupling Efficiency is Smaller than 70% | 0.07 | 0.13 | 0.31 | 0.78 | Not preferable Because Return Light is 0.5% or Greater |
| | 60 | | 0.02 | 0.08 | 0.29 | 0.78 | |
| | 45 | | 0.03 | 0.10 | 0.29 | 0.78 | |
| | 30 | | 0.02 | 0.09 | 0.29 | 0.78 | |
| | 15 | | 0.02 | 0.08 | 0.29 | 0.78 | |
| | <15 | Metal Mold Working is Not Possible | | | | | |

TABLE 2

| Light Coupling Efficiency (%) | | Curvature Radius (mm) of First Emission Surface | | | | | |
|---|---|---|---|---|---|---|---|
| | | <0.02 | 0.02 | 0.03 | 0.05 | 0.1 | >0.10 |
| Inclination Angle (°) of Second Emission Surface | >75 | Less Effective against Return Light | | | | | |
| | 75 | Not Preferable Because Light Coupling Efficiency is Smaller than 70% | 83.2 | 84.4 | 84.4 | 84.4 | Not preferable Because Return Light is 0.5% or Greater |
| | 60 | | 46.7 | 74.5 | 84.4 | 84.5 | |
| | 45 | | 46.2 | 74.5 | 84.4 | 84.5 | |
| | 30 | | 46.8 | 74.5 | 84.4 | 84.5 | |
| | 15 | | 46.1 | 74.4 | 84.4 | 84.5 | |
| | <15 | Metal Mold Working is Not Possible | | | | | |

Resulting evaluations of the return light (%) and the light coupling efficiency (%) in the relationship with the curvature radius (mm) of the first emission surface and the inclination angle (°) of the second emission surface are shown in Table 3. In Table 3, when both the return light and the light coupling of were favorable, the evaluation was "Good"; when only the return light was favorable, the evaluation was "Fair"; and when the return light was poor, the evaluation was "Poor".

TABLE 3

| Inclination Angle (°) of Second Emission Surface | Curvature Radius (mm) of First Emission Surface | | | | |
|---|---|---|---|---|---|
| | <0.02 | 0.02 | 0.03 | 0.05 | 0.1 |
| >75 | Poor | Poor | Poor | Poor | Poor |
| 75 | Poor | Fair(OK, NG) | Good(OK, OK) | Good(OK, OK) | Poor |
| 60 | Poor | Fair(OK, NG) | Good(OK, OK) | Good(OK, OK) | Poor |
| 45 | Poor | Fair(OK, NG) | Good(OK, OK) | Good(OK, OK) | Poor |
| 30 | Poor | Fair(OK, NG) | Good(OK, OK) | Good(OK, OK) | Poor |
| 15 | Poor | Good(OK, OK) | Good(OK, OK) | Good(OK, OK) | Poor |
| <15 | Poor | Poor | Poor | Poor | Poor |

As shown in Table 1, it can be seen that when the curvature radius of first emission surface 143a is equal to or greater than 0.02 mm and smaller than 0.1 mm, the return light can be suppressed. In particular, it can be seen that when the curvature radius of first emission surface 143a falls within the range of 0.02 to 0.05 mm, the return light can be further suppressed. When the curvature radius of first emission surface 143a is greater than 0.1 mm, the return light excessively increases in many cases. When the curvature radius of first emission surface 143a is smaller than 0.02, the light coupling efficiency may be possibly reduced. In addition, as shown in Table 1, it can be seen that when the inclination angle of second emission surface 143b falls within the range of 15° to 75°, the return light can be suppressed.

As shown in Table 2, it can be seen that when the curvature radius of first emission surface 143a falls within the range of 0.02 to 0.1 mm, high light coupling efficiency can be maintained. In particular, it can be seen that when the curvature radius of first emission surface 143a is equal to or greater than 0.03 mm and smaller than 0.10 mm, high light coupling efficiency can be further maintained. When the curvature radius of first emission surface 143a is greater than 0.1 mm, the return light excessively increases in many cases. When the curvature radius of first emission surface 143a is smaller than 0.02, the light coupling efficiency may be possibly reduced. In addition, as shown in Table 2, it can be seen that when the inclination angle of second emission surface 143b falls within the range of 15° to 75°, high light coupling efficiency can be maintained. Note that when the curvature radius of first emission surface 143a is 0.02, the light coupling efficiency is slightly lower, but the return light can be suppressed.

As shown in Table 3, while it is difficult to achieve both the suppression of the return light and the maintenance of the light coupling efficiency, both the suppression of the return light and the maintenance of the light coupling efficiency can be achieved when a predetermined condition is satisfied. In addition, the return light can be suppressed in a wide range.

Effect

As described above, optical module 100 according to the present embodiment includes first emission surface 143a having a spherical cap shape and second emission surface 143b in the form of an inclined surface, and thus the light enters optical transmission member 160 at the outer edge of core 161 more than at the center of core 161. In addition, the reflection light reflected at end surface 163 of optical transmission member 160 travels away from optical axis OA of light-emitting element 122, and, when emitted to the outside from optical receptacle 140 again, the light travels further away from optical axis OA of light-emitting element 122. In this manner, high light coupling efficiency can be maintained while suppressing the return light.

INDUSTRIAL APPLICABILITY

The optical receptacle and the optical module according to the present invention are suitable for optical communications using an optical transmission member.

REFERENCE SIGNS LIST

100 Optical module
120 Photoelectric conversion device
121 Substrate
122 Light-emitting element
140 Optical receptacle
141 Incidence surface
142 First surface
143 Emission surface
143a First emission surface
143b Second emission surface
144 Second surface
145 Substrate fixing part
147 Positioning part
160 Optical transmission member
161 Core
162 Clad
163 End surface
CA1 First central axis
CA2 Second central axis
OA Optical axis

The invention claimed is:

1. An optical receptacle disposed between a light-emitting element and an optical transmission member and configured to optically couple the light-emitting element and the optical transmission member, the optical receptacle comprising:
 an incidence surface configured to allow incidence of light emitted from the light-emitting element; and
 an emission surface configured to emit, toward the optical transmission member, light entered from the incidence surface and travelled inside the optical receptacle, the emission surface being an inner surface of a recess,
 wherein the emission surface includes:
  a first emission surface having a substantially spherical cap shape, and
  a second emission surface contiguous with the first emission surface, the second emission surface having a shape of a side surface of a substantially frustum shape,
 wherein an angle of the second emission surface with respect to a central axis of the substantially frustum shape is 15° to 75° and a curvature radius of the first emission surface in a cross section including the central axis of the substantially frustum shape is equal to or greater than 0.02 mm and smiler than 0.10 mm.

2. The optical receptacle according to claim 1, wherein the curvature radius of the first emission surface in the cross section is equal to or greater than 0.02 mm and equal to or smaller than 0.05 mm.

3. The optical receptacle according to claim 1, wherein the curvature radius of the first emission surface in the cross section is equal to or greater than 0.03 mm and equal to or smaller than 0.05 mm.

4. An optical module, comprising:
 a photoelectric conversion device including a light-emitting element; and
 the optical receptacle according to claim 1 that is configured to optically couple light emitted from the light-emitting element with an optical transmission member.

* * * * *